Patented June 10, 1941

2,245,480

UNITED STATES PATENT OFFICE 2,245,480

TOCOPHEROL DERIVATIVES AND MANUFACTURE THEREOF

Paul Karrer, Zurich, Switzerland, assignor to Hoffmann-La Roche Inc., Nutley, N. J., a corporation of New Jersey No Drawing. Application May 16, 1939, Serial No. 273,998. In Switzerland June 1, 1938

2 Claims. (Cl. 260—333)

In wheat germ oil and other oils of vegetable germs an oil similar to the so-called α-tocopherol occurs, which is described in the literature under various names, such as β-tocopherol, neo-tocopherol, cumo-tocopherol etc.

It has now been found that by causing α, β-unsaturated alkyl halides of the formula $XCH_2CR=CHR'$ (X=halogen, R and R'=hydrogen or alkali groups) to act on β-tocopherol in presence of an acid condensing agent, it is possible to introduce the alkylene group $-CH_2CR=CHR'$ into β-tocopherol. Thereby, this alkylene group probably enters the benzene nucleus, homologues of β-tocopherols being formed. The following materials can be used as unsaturated alkyl halides: allyl bromide, phytyl bromide and the like. For the purpose of bringing about the condensation, zinc chloride, aluminium chloride and the like can be employed.

The new compounds possess a stronger reducing action on neutral silver nitrate solution than β-tocopherol. They are to be used as medicinal preparations.

Example 4 parts by weight of β-tocopherol are dissolved in 80 parts by weight of anhydrous benzine boiling at 70–80° C. Then 4 parts by weight of anhydrous zinc chloride and 20 parts by weight of allyl bromide are added and the reaction mixture heated to boiling for 2 hours under a reflux condenser. During the reaction hydrogen bromide escapes. When the reaction has come to an end, the product is diluted with water, the aqueous layer separated from the petroleum ether layer, which is washed with water, and the solvent evaporated in vacuo. An oily residue remains which represents the condensation product from β-tocopherol and allyl bromide, the allyl β-tocopherol. The compound already reduces alcoholic silver nitrate solution at room temperature and has an absorption maximum at about 293μμ.

I claim:

1. Process for the manufacture of allyl-β-tocopherol, comprising reacting allyl halide with β-tocopherol in the presence of an acid condensing agent.

2. Allyl-β-tocopherol produced by condensing an allyl halide with β-tocopherol under acid conditions.

PAUL KARRER.